(No Model.)

G. A. ANDERSON.
FRICTION CLUTCH.

No. 572,238. Patented Dec. 1, 1896.

Witnesses
R. Ford Coombs
Edward D. Johnson

Inventor
Gustaf A. Anderson.
By Attorney Herbert W. T. Jenner.

UNITED STATES PATENT OFFICE.

GUSTAF ARVID ANDERSON, OF WAYNESBOROUGH, PENNSYLVANIA, ASSIGNOR TO THE GEISER MANUFACTURING COMPANY, OF SAME PLACE.

FRICTION-CLUTCH.

SPECIFICATION forming part of Letters Patent No. 572,238, dated December 1, 1896.

Application filed April 11, 1896. Serial No. 587,066. (No model.)

*To all whom it may concern:*

Be it known that I, GUSTAF ARVID ANDERSON, a subject of the King of Sweden and Norway, residing at Waynesborough, in the county of Franklin and State of Pennsylvania, have invented certain new and useful Improvements in Friction-Clutches; and I do hereby declare the following to be a full, clear, and exact description of the invention, such as will enable others skilled in the art to which it appertains to make and use the same.

This invention relates to friction-clutches provided with radially-movable shoes; and it consists in the novel construction and combination of the parts hereinafter fully described and claimed.

Figure 1:
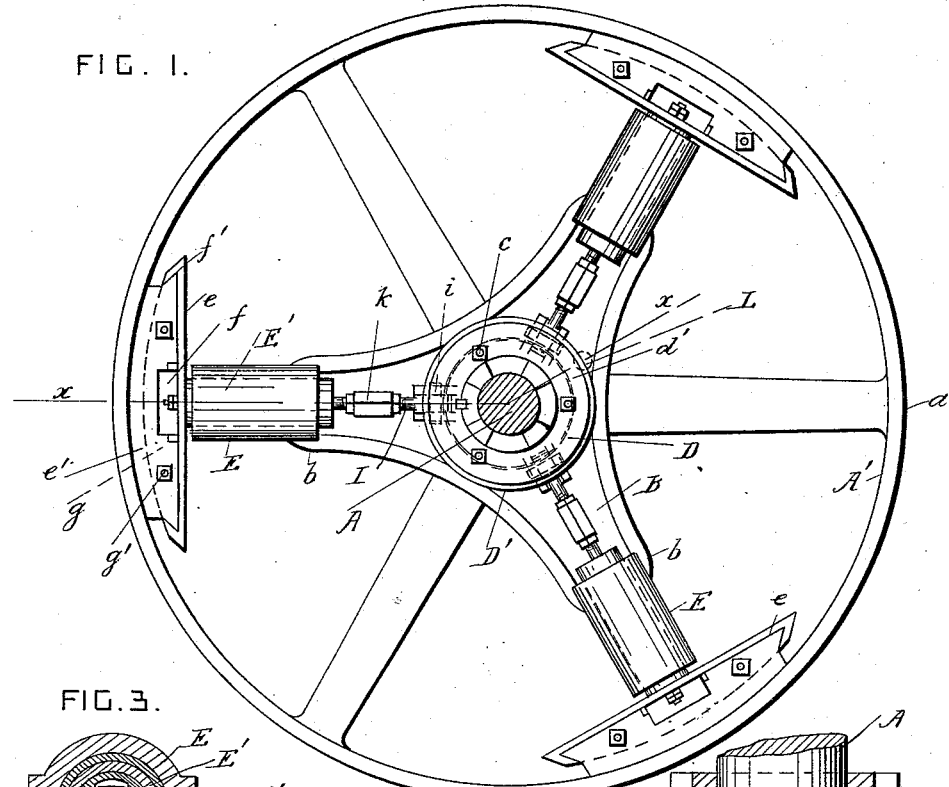
Figure 3:
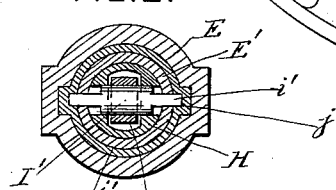
Figure 2:
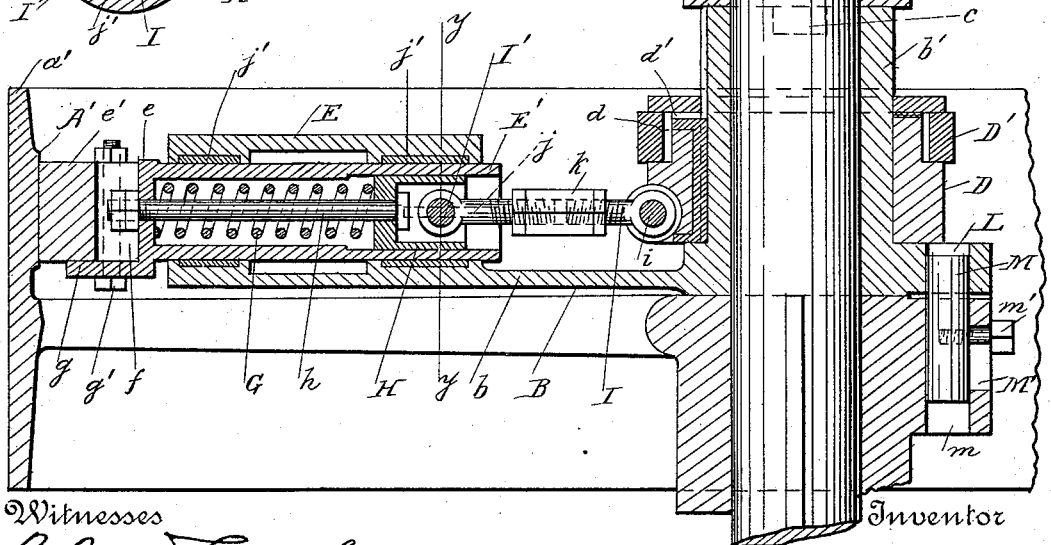

In the drawings, Figure 1 is a front view of the clutch. Fig. 2 is a sectional side view taken on the line $x\ x$ in Fig. 1. Fig. 3 is a cross-section taken on the line $y\ y$ in Fig. 2.

A is a driving-shaft, and $a'$ is a fly-wheel secured thereon. The fly-wheel is provided with a cylinder $A'$ in the inside of its periphery, and this cylinder forms one member of the clutch.

B is a spider journaled on the shaft A and provided with similar arms $b$. Three arms $b$ are preferably provided; but the number of the arms is not material.

C is a toothed pinion or other similar driving device operatively secured to the hub $b'$ of the spider B by projections $c$ or in any other approved manner. The spider and the parts carried by it form the other member of the clutch.

D is a ring splined upon the hub $b'$ of the spider and provided with a circumferential groove $d$. This groove preferably has an adjustable plate $d'$ on one side, which can be set up when the parts become worn.

$D'$ is a ring journaled in the groove $d$. The ring D is slid back and forth by means of any approved operating device, such as a forked lever connected to the ring $D'$ and not shown in the drawings.

Each arm $b$ of the spider is provided with a guide, preferably consisting of a cylinder E, and $E'$ is a hollow plunger slidable in the said cylinder. The plunger $E'$ is provided with a shoe $e$ at its outer end, and $e'$ is a block of hard wood or other similar material secured in the said shoe. The block $e'$ has a cross-groove $f$ at the lower part of its center, and has dovetailed ends $f'$, which engage with the dovetailed ends of the shoe. The shoe has a flange $g$ upon its rear side only, and $g'$ are bolts which secure the block to the said flange. When the block $e'$ becomes worn, it can be slid out of the shoe and another block substituted for it. A helical spring G is placed inside the plunger $E'$ and bears against the under side of the shoe $e$.

H is a hollow piston which is slidable in the lower part of the plunger $E'$. This piston bears against the spring G, and $h$ is a bolt which passes through the said piston, spring, and shoe and holds the said spring compressed to a prearranged normal tension within the plunger. The nuts of the bolt $h$ come within the groove $f$ of the block $e'$, and its head comes inside the hollow piston.

I is a link provided with a pin $i$ at one end, pivotally connecting it to lugs on the ring D. The other end of the link I is provided with a pin $I'$, pivotally connecting it with the piston H. The ends of the pin $I'$ are provided with projections $i'$, which slide in guide-grooves $j$ in the plunger and in the cylinder E, so that the plunger and piston are prevented from revolving in the cylinder.

The wearing-surfaces of the cylinder E are preferably provided with liners $j'$ of Babbitt metal.

The link I is preferably made in two parts provided with right and left hand screw-threaded ends, coupled together by a turnbuckle $k$, so that the length of the link may be adjusted; but the length of the link may be adjusted by any other approved means.

When the ring D is slid toward the spider, the blocks $e'$ are forced into contact with the cylinder B and the spider is revolved. The springs G permit the blocks to bear on the cylinder with a slightly-elastic pressure and permit the links I to be placed radially straight, so that when the clutch members are in driving contact there is no pressure upon the ring D'. In this position no wear comes on the ring D', as the slidable clutch member holds itself in gear, and the springs G are compressed slightly above their normal tension.

When the ring D is slid away from the spider, the springs G expand until their further expansion is prevented by the bolts $h$, and the blocks are then moved positively away from the cylinder by a very slight additional movement of the ring D.

The spider is also provided with a lateral hole L in its hub, and M is a bolt which is slidable in a lateral hole $m$ in the hub of the fly-wheel. M' is a slot above the hole $m$, and $m'$ is a set-screw which passes through the said slot and is screwed into the side of the bolt M.

When the friction-clutch is not required in use, the two clutch members can be positively connected together by slacking the set-screw, moving the bolt into the position shown in Fig. 2 by means of the head of the set-screw, and then tightening the set-screw to prevent the bolt from slipping back out of the hole L.

What I claim is—

1. The combination, with one friction-clutch member comprising an internal cylinder; of another friction-clutch member comprising a spider provided with guides, a ring slidable on the hub of the spider, hollow plungers slidable in the said guides and carrying blocks for engaging with the internal cylinder, pistons slidable in the said plungers, springs arranged in the plungers, slidable bolts positively connecting the said plungers with their respective pistons and confining the said springs under a prearranged tension, and links pivoted to the said slidable ring and pistons, substantially as set forth.

2. The combination, with one friction-clutch member comprising an internal cylinder; of another friction-clutch member comprising a spider provided with a guide-cylinder, a ring slidable on the hub of the spider, a hollow plunger slidable in the guide-cylinder and carrying a block for engaging with the internal cylinder, a hollow piston slidable in the said plunger, a spring arranged in the plunger, a slidable bolt positively connecting the plunger and piston and confining the spring under a prearranged tension, a pin passing transversely through the said piston and provided with projecting ends engaging with grooves in the said plunger and guide-cylinder, and a link pivoted on the said pin and pivotally connected with the said slidable ring, substantially as set forth.

3. The combination, with one friction-clutch member comprising an internal cylinder; of another friction-clutch member comprising hollow slidable plungers carrying blocks for engaging with the internal cylinder, pistons slidable in the said plungers, springs arranged between the said plungers and pistons, means for confining the springs under a prearranged minimum tension, a support for the said plungers, and means for moving the plungers radially in the said support, substantially as set forth.

In testimony whereof I affix my signature in presence of two witnesses.

GUSTAF ARVID ANDERSON.

Witnesses:
 DANIEL S. BEARD,
 E. G. CLYNNANS